US008494752B2

(12) United States Patent
Adachi et al.

(10) Patent No.: US 8,494,752 B2
(45) Date of Patent: Jul. 23, 2013

(54) ENGINE

(75) Inventors: Hitoshi Adachi, Osaka (JP); Shusuke Okada, Osaka (JP); Tomohiro Otani, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 810 days.

(21) Appl. No.: 12/665,530

(22) PCT Filed: Jul. 25, 2008

(86) PCT No.: PCT/JP2008/063385
§ 371 (c)(1), (2), (4) Date: Dec. 18, 2009

(87) PCT Pub. No.: WO2009/014208
PCT Pub. Date: Jan. 29, 2009

(65) Prior Publication Data

US 2010/0198484 A1 Aug. 5, 2010

(30) Foreign Application Priority Data

Jul. 26, 2007 (JP) ................................ 2007-195213

(51) Int. Cl.

| | |
|---|---|
| ***B60T 7/12*** | (2006.01) |
| ***G05D 1/00*** | (2006.01) |
| ***G06F 7/00*** | (2006.01) |
| ***G06F 17/00*** | (2006.01) |

(52) U.S. Cl.
USPC .......................................................... 701/103

(58) Field of Classification Search
USPC ............... 123/436, 478, 492, 179.16, 179.17, 123/352, 357, 491; 701/103, 104, 110, 113
See application file for complete search history.

(56) References Cited

U.S. PATENT DOCUMENTS 5,770,796 A * 6/1998 Sakamoto et al. ......... 73/114.41
(Continued)

FOREIGN PATENT DOCUMENTS

| | | |
|---|---|---|
| JP | 62-023552 | 1/1987 |
| JP | 05-332189 | 12/1993 |
| JP | 2002-089344 | 3/2002 |
| JP | 2007-170203 | 7/2007 |

(Continued)

OTHER PUBLICATIONS

International Search Report for International Application No. PCT/JP2008/063385, mailed Oct. 21, 2008, 2 pgs.

*Primary Examiner* — Stephen K Cronin
*Assistant Examiner* — Sizo Vilakazi
(74) *Attorney, Agent, or Firm* — Sterne, Kessler, Goldstein & Fox P.L.L.C.

(57) ABSTRACT

The purpose of the present invention is to provide an engine having a revision means which regulates rotation speed of each of cylinders while reflecting specific unevenness of rotation of each of the cylinders. With regard to an engine 2 having a plurality of cylinders wherein opening timing of each of injectors 3 can be controlled respectively, comprising an individual standard rotation speed output unit 30 which outputs individual standard rotation speed Nstdi of each of the cylinders following fuel injection of the corresponding injector 3 when all the injectors 3 are in normal state, an engine rotation speed sensor 6 which detects individual actual rotation speed Ni of each of the cylinders following the fuel injection of the corresponding injector 3, and a revision amount calculation unit 50 which calculates revision amount of fuel injection amount to each of the cylinders from the corresponding injector 3 based on difference between the individual standard rotation speed Nstdi stored in the individual standard rotation speed output unit 30 and the individual actual rotation speed Ni calculated by the engine rotation speed sensor 6.

2 Claims, 8 Drawing Sheets

U.S. PATENT DOCUMENTS

2004/0118385 A1* 6/2004 Katoh et al. .................. 123/491
2006/0293828 A1* 12/2006 Ishizuka et al. ............... 701/105
2007/0015630 A1* 1/2007 Miyazaki ...................... 477/111
2008/0009999 A1* 1/2008 Sugiyama ..................... 701/103

* cited by examiner

ENGINE

TECHNICAL FIELD

The present invention relates to a multi-cylinder engine.

BACKGROUND ART

Conventionally, there is well known a multi-cylinder engine that each of the cylinders has a fuel injection valve. Such a multi-cylinder engine cannot obtain a stable driving state because of dispersion of rotation speed of each of the cylinders caused by specific dispersion of the fuel injection valves, structural tolerance of each of the cylinders, opening and closing timing of a suction and exhaust valve, or change with time of the engine. Then, there is also known an engine which controls fuel injection so as to reduce dispersion of rotation speed of each of the cylinders. The Japanese Patent Hei. 07-059911 discloses a control art of cylinders, whose order of combustion is continuous, that fuel injection amount of a certain cylinder is revised so as to make the maximum rotation speed equal to that of the cylinder just before at the time just after combustion.

However, dispersion of rotation speed may exist between each of the cylinders of the engine. By connecting load such as a hydraulic pump always to the engine, rotation alternation different from that following piston reciprocation of the engine may cause dispersion of rotation speed between each of the cylinders. The fuel injection amount revision control of the Japanese Patent Hei. 07-059911 is performed so as to make the maximum rotation speed of each of the cylinders equal to each other, whereby fuel injection amount may not be revised within the range of dispersion. In the case that the specific unevenness of rotation exists between the cylinders, when fuel amount is revised so as to make the rotation speed of each of the cylinders equal to each other, the specific alternation is also canceled, whereby it is disadvantageous because the fuel injection may be stopped or excessive injection may occur.

DISCLOSURE

Problems to be Solved by the Invention

The purpose of the present invention is to provide an engine having a revision means which regulates rotation speed of each of the cylinders while reflecting specific unevenness of rotation of each of the cylinders.

Means for Solving the Problems

An engine according to the present invention, wherein a fuel injection valve is provided in each of the cylinders and opening timing of each of the fuel injection valves can be controlled respectively, comprises an individual standard rotation speed output means which outputs individual standard rotation speed of each of the cylinders following fuel injection of the corresponding fuel injection valve when all the fuel injection valves are in normal state, an individual actual rotation speed calculation means which calculates individual actual rotation speed of each of the cylinders following the fuel injection of the corresponding fuel injection valve, and a revision amount calculation means which calculates revision amount of fuel injection amount to each of the cylinders from the corresponding fuel injection valve based on difference between the individual standard rotation speed and the individual actual rotation speed.

With regard to the engine according to the present invention, preferably, the individual standard rotation speed output means stores difference from the standard rotation speed for each engine rotation speed region or each load region, and the difference from the standard rotation speed of each of the cylinders is selected corresponding to the engine rotation speed region or the load region.

With regard to the engine according to the present invention, preferably, the individual standard rotation speed output means regards crank angle at a center point between a compression top dead point of the certain cylinder and a compression top dead point of the next cylinder at the time that all the fuel injection valves are in normal state as standard crank angle of the certain cylinder, and average of actual rotation speed based on fixed change of crank angle until reaching standard of crank angle of each of the cylinders is selected as the individual standard rotation speed of the cylinder, and the individual actual rotation speed calculation means regards crank angle at a center point between a compression top dead point of the certain cylinder and a compression top dead point of the next cylinder as standard crank angle of the certain cylinder, and average of actual rotation speed based on fixed change of crank angle until reaching standard of crank angle of each of the cylinders is selected as the individual actual rotation speed of the cylinder.

With regard to the engine according to the present invention, preferably, the individual standard rotation speed output means selects maximum actual rotation speed from a compression top dead point of each of the cylinders to a compression top dead point of the corresponding next cylinder at the time that all the fuel injection valves are in normal state as the individual standard rotation speed, and the individual actual rotation speed calculation means selects maximum actual rotation speed from a compression top dead point of each of the cylinders to a compression top dead point of the corresponding next cylinder as the individual actual rotation speed.

With regard to the engine according to the present invention, preferably, the individual standard rotation speed output means selects rotation speed at the time of production and shipment or at the time of regulation of the fuel injection valves as the individual standard rotation speed.

With regard to the engine according to the present invention, preferably, the individual standard rotation speed output means selects rotation speed at the time that fuel injection is stopped and the engine is motored as the individual standard rotation speed.

With regard to the engine according to the present invention, preferably, the individual standard rotation speed output means selects rotation speed in the state that the engine is connected to a working machine at the time that all the fuel injection valves are in normal state as the individual standard rotation speed.

With regard to the engine according to the present invention, the engine has a detection means detecting a driving state of the engine, and the revision amount calculation means calculates revision amount when the detection means detects a setting state of the engine.

Effect of the Invention

According to the engine of the present invention, the basic injection amount is revised based on the difference between the individual standard rotation speed and the individual actual rotation speed of each of the cylinders, whereby the rotation speed of each of the cylinders can be regulated while reflecting the specific unevenness of rotation of the cylinders.

According to the engine of the present invention, the rotation speed of each of the cylinders can be regulated while reflecting the specific unevenness of rotation of the cylinders for each engine rotation speed region or each load region.

According to the engine of the present invention, the rotation speed of each of the cylinders can be regulated while reflecting the specific unevenness of rotation of the cylinders based on the rotation speed corresponding to the combustion process of each cylinder.

According to the engine of the present invention, even if the change of rotation speed between the compression top dead point of each cylinder and the compression top dead point of the next cylinder is asymmetric about the crank angle, the rotation speed of each cylinder can be regulated while reflecting specific unevenness of rotation of each cylinder based on the rotation speed corresponding to the combustion process of each cylinder.

According to the engine of the present invention, the rotation speed of each cylinder can be regulated while reflecting specific unevenness of rotation of each cylinder without influence of secular degradation and the like.

According to the engine of the present invention, at the time of shipment from the factory or the like, even if the engine cannot be driven actually, the individual standard rotation speed in the no-load state can be judged by the motoring so as to regulate the rotation speed of each cylinder while reflecting specific unevenness of rotation of each cylinder.

According to the engine of the present invention, even if the engine is unitized with a working vehicle such as a hydraulic pump or a dynamo which is always connected to the engine, revision accuracy of fuel injection amount can be improved.

According to the engine of the present invention, the rotation speed of each of the cylinders can be adjusted while reflecting the fixed unevenness of rotation between the cylinders exclusive of influence of change of rotation at the transitional period caused by the acceleration/deceleration or change of the load.

THE BEST MODE FOR CARRYING OUT THE INVENTION

Explanation will be given on a four-cylinder four-cycle common-rail type diesel engine (hereinafter, referred to as "engine") 1 as an embodiment of the present invention referring to FIG. 1.

Figure 1:
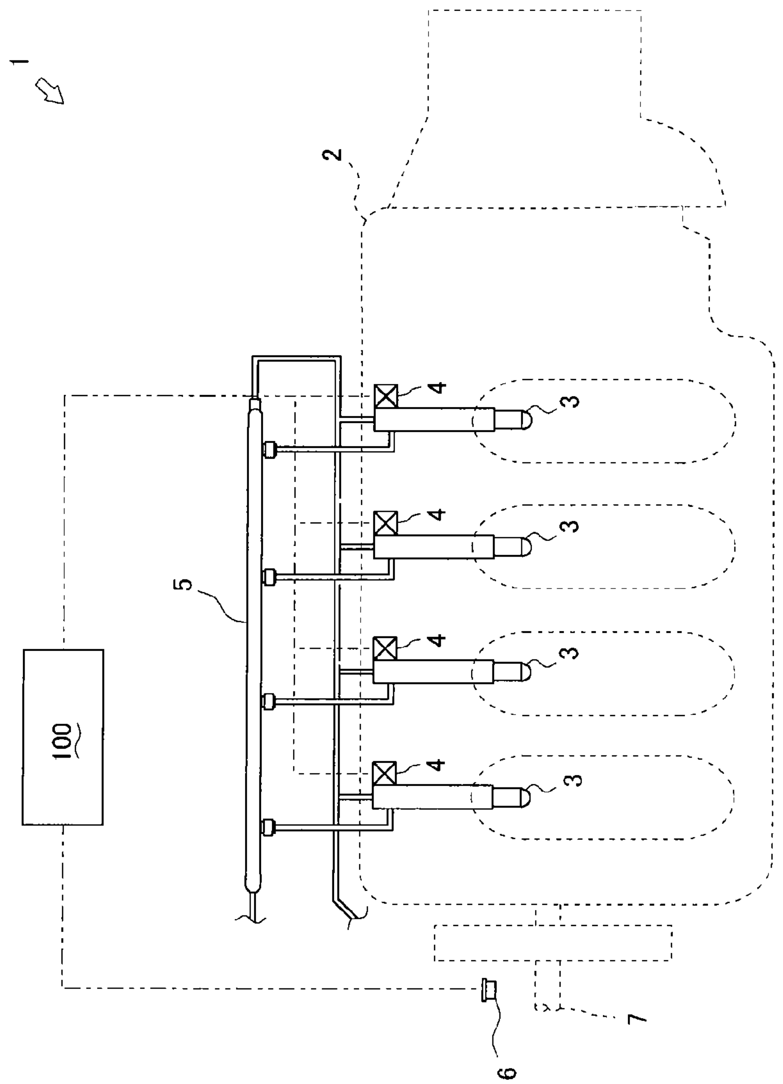
FIG. 1 is a schematic drawing of entire construction of a common-rail type diesel engine according to the present invention.

As shown in FIG. 1, the engine 1 comprises a diesel engine main body (hereinafter, referred to as "engine main body") 2, four injectors 3, a common rail 5 and an engine control unit (hereinafter, referred to as "ECU") 100.

The engine main body 2 is a main body of the four-cylinder four-cycle diesel engine. Each of the injectors 3 has an electromagnetic valve 4 and is disposed in corresponding one of the cylinders as a fuel injection valve. High pressure fuel is accumulated in the common rail 5, and the high pressure fuel is distributed to the injectors 3. The ECU 100 controls each of the electromagnetic valves 4 of the injectors 3 individually to open and close so as to inject optimal amount of fuel to the cylinders of the engine main body 2 at optimal timing.

The present invention is not limited to the engine 1 and any engine which can control individually opening timing of each fuel injection valve can be used. The number of cylinders is also not limited.

The engine 1 has an engine rotation speed sensor 6 as an individual actual rotation speed calculation means. The engine rotation speed sensor 6 is connected to the ECU 100. The engine rotation speed sensor 6 comprises a pulse sensor 6*a* and a pulser 6*b*, and calculates rotation speed based on the time required for fixed change of angle of a crankshaft 7 provided in the engine main body 2 (distance between pulse detection times).

Figure 7:
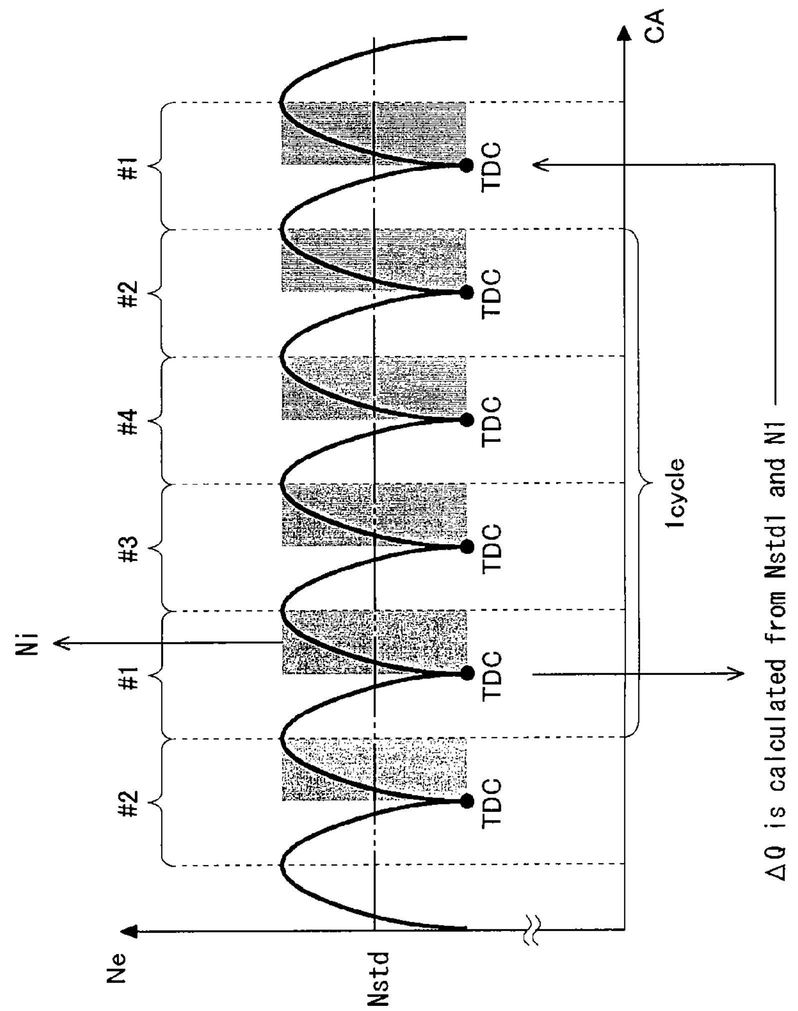
FIG. 7 is a graph of rotation speed against crank angle showing operation timing about standard rotation speed.

Explanation will be given on standard rotation speed Nstd and individual actual rotation speed Ni ("i" indicates each of the cylinders) referring to FIG. 7. FIG. 7 shows change of rotation speed (angular speed) of each of the cylinders (#1 to #4) while the axis of abscissas indicates crank angle (CA) and the axis of ordinates indicates rotation speed (Ne). The engine 1 of this embodiment is the four-cylinder four-cycle diesel engine and has a combustion cycle that fuel is injected to a first cylinder (#1), a third cylinder (#3), a fourth cylinder (#4), and a second cylinder (#2) in this order and the crankshaft is made two revolutions over one cycle. The rotation speed is minimum at the crank angle of the top dead point (TDC) of each cylinder.

The standard rotation speed Nstd is the average of angular speed accompanying the fuel injection of each cylinder and is shown by a two-dot chain line in FIG. 7. The individual actual rotation speed Ni is angular speed accompanying the fuel injection of each cylinder. The crank angle at the TDC of the certain cylinder is referred to as "TDC crank angle", and the crank angle at the center point between the TDC of the certain cylinder and the TDC of the next cylinder (the point showing the maximum rotation speed in FIG. 7) is referred to as "standard crank angle". Then, the individual actual rotation speed Ni is the average of rotation speed between the TDC crank angle and the standard crank angle of each cylinder. Namely, the individual actual rotation speed Ni of each cylinder is the average of rotation speed in the meshed part of FIG. 7.

The standard rotation speed Nstd of each cylinder is the individual actual rotation speed Ni that all the cylinders are at in the initial state. The initial state means enough maintained state such as at the shipment or just after the maintenance, and is referred to as "normal state" in this specification. Though the individual actual rotation speed Ni is defined as the average of rotation speed between the TDC crank angle and the standard crank angle of each cylinder, the starting point may be shifted forward or rearward from the TDC crank angle. In effect, what is required is only to set the starting point crank angle to the standard crank angle so as to reflect the rotation speed in the combustion process of the certain cylinder.

Next, explanation will be given on a fuel injection amount revision system 10 of this embodiment referring to FIG. 2.

The fuel injection amount revision system 10 is disposed in the ECU 100 and revises the rotation speed of each cylinder of the engine main body 2.

Figure 2:
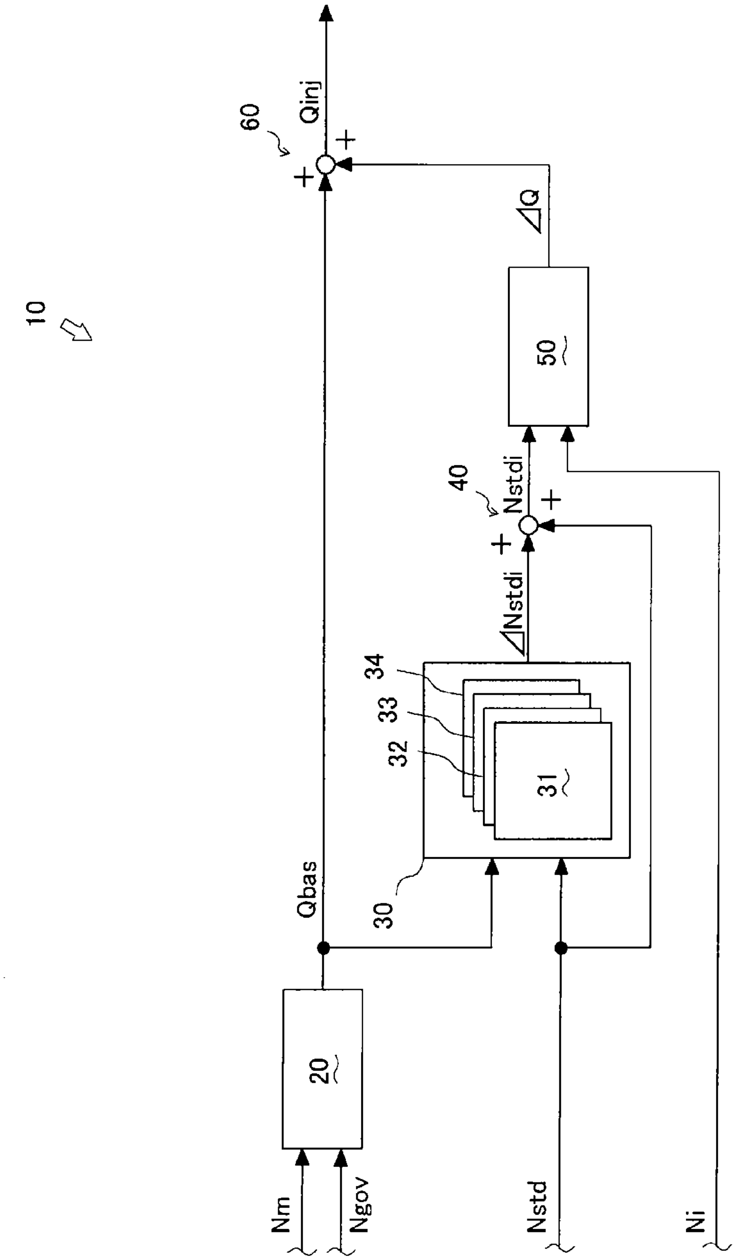
FIG. 2 is a block drawing of an each cylinder injection amount revision means.

As shown in FIG. 2, the fuel injection amount revision system 10 comprises a basic injection amount output unit 20, an individual standard rotation speed output unit 30, a difference operation unit 40, a revision amount calculation unit 50 and an injection amount operation unit 60.

The basic injection amount output unit 20 outputs basic injection amount Qbas from engine target rotation speed Nm and engine actual rotation speed Ngov. Namely, the basic injection amount output unit 20 outputs the basic injection amount Qbas so as to make the engine actual rotation speed Ngov close to the engine target rotation speed Nm. The basic injection amount output unit 20 outputs the basic injection amount Qbas so as to decrease the difference between the engine target rotation speed Nm and the engine actual rotation speed Ngov for example by PID control.

The purpose of the basic injection amount output unit 20 is not to perform the control of the rotation speed of each cylinder which is the concept of the present invention, but to stabilize the rotation speed of the whole engine 1. The engine actual rotation speed Ngov in this embodiment is the moving average from the latest Ni to Ni of the cylinder several numbers before.

The individual standard rotation speed output unit 30 outputs individual standard rotation speed difference ΔNstdi from the basic injection amount Qbas and the standard rotation speed Nstd.

Furthermore, the individual standard rotation speed output unit 30 has individual standard rotation speed difference maps 31 to 34 as selection means respectively corresponding to the four cylinders of the engine 1.

The difference operation unit 40 calculates individual standard rotation speed Nstdi from the standard rotation speed Nstd and the individual standard rotation speed difference ΔNstdi.

The revision amount calculation unit 50 calculates injection revision amount ΔQ from the individual standard rotation speed Nstdi and the individual actual rotation speed Ni. The revision amount calculation unit 50 calculates the injection revision amount ΔQ so as to make the difference between the individual standard rotation speed Nstdi and the individual actual rotation speed Ni small for example by PI control.

The injection amount operation unit 60 calculates injection amount Qinj from the basic injection amount Qbas and the injection revision amount ΔQ. Each of the injectors 3 injects respective injection amount Qinj to the corresponding cylinder.

The basic injection amount Qbas is revised based on the difference between the individual standard rotation speed Nstdi and the individual actual rotation speed Ni (the individual standard rotation speed difference ΔNstdi) of each of the cylinders, whereby the rotation speed of each of the cylinders can be regulated while reflecting the specific unevenness of rotation of the cylinders.

Explanation will be given on the timing of fuel injection amount revision control using the revision amount calculation unit 50 referring to FIG. 3.

Figure 3:
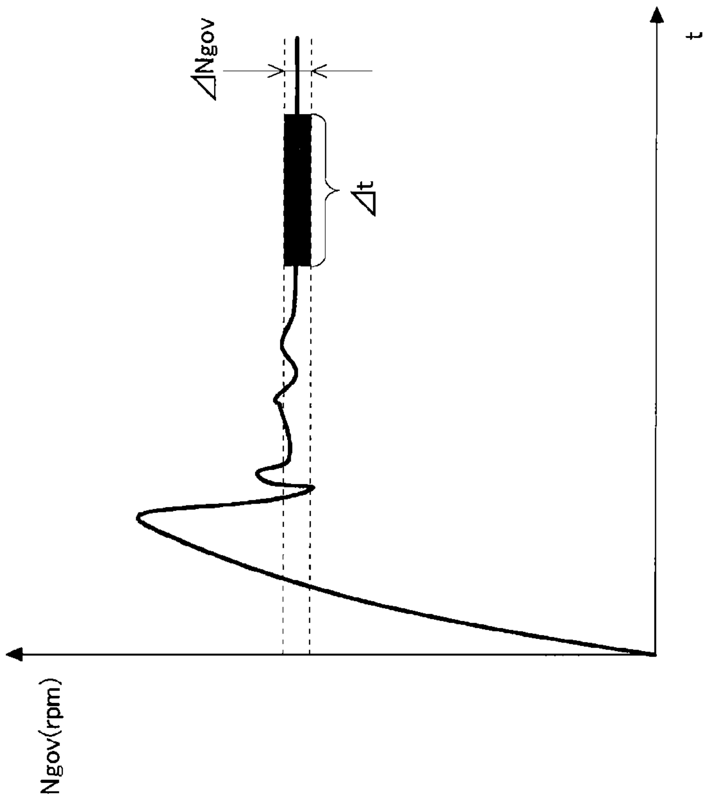
FIG. 3 is a graph of timing of the each cylinder injection amount revision means.

FIG. 3 shows time series change of the engine actual rotation speed Ngov detected by the engine rotation speed sensor 6. As shown in the diagram, the fuel injection amount revision control using the revision amount calculation unit 50 is only performed in the case that the engine actual rotation speed Ngov converges for fixed time Δt within fixed engine actual rotation speed width ΔNgov. Namely, the fuel injection amount revision control based on the individual standard rotation speed Nstdi is performed at the time of setting, and the fuel injection amount revision control is stopped and the fuel injection amount is controlled based on only the basic injection amount Qbas at the transitional period.

The fixed engine actual rotation speed width ΔNgov shows the width of the engine actual rotation speed Ngov and does not depend on the magnitude of the engine actual rotation speed Ngov.

According to the construction, the rotation speed of each of the cylinders can be adjusted while reflecting the fixed unevenness of rotation between the cylinders exclusive of influence of change of rotation at the transitional period caused by the acceleration/deceleration or change of the load.

Explanation will be given on the individual standard rotation speed difference maps 31 to 34 as selection means in detail referring to FIG. 4.

The individual standard rotation speed difference ΔNstdi is difference of rotation speed between the individual actual rotation speed Ni of each of the cylinders (the individual standard rotation speed Nstdi) and the standard rotation speed Nstd in the case that all the fuel injection valves are at the normal state, and is previously provided for each engine load and each individual standard rotation speed Nstdi.

Each of the individual standard rotation speed difference maps 31 to 34 is indicated by the matrix that the line is the basic injection amount Qbas as an alternate index of the engine load and the row is the standard rotation speed Nstd as the engine rotation speed. Namely, each of the individual standard rotation speed difference maps 31 to 34 shows dispersion of the corresponding cylinder against the standard rotation speed Nstd for each load state and each standard rotation speed.

Figure 4:
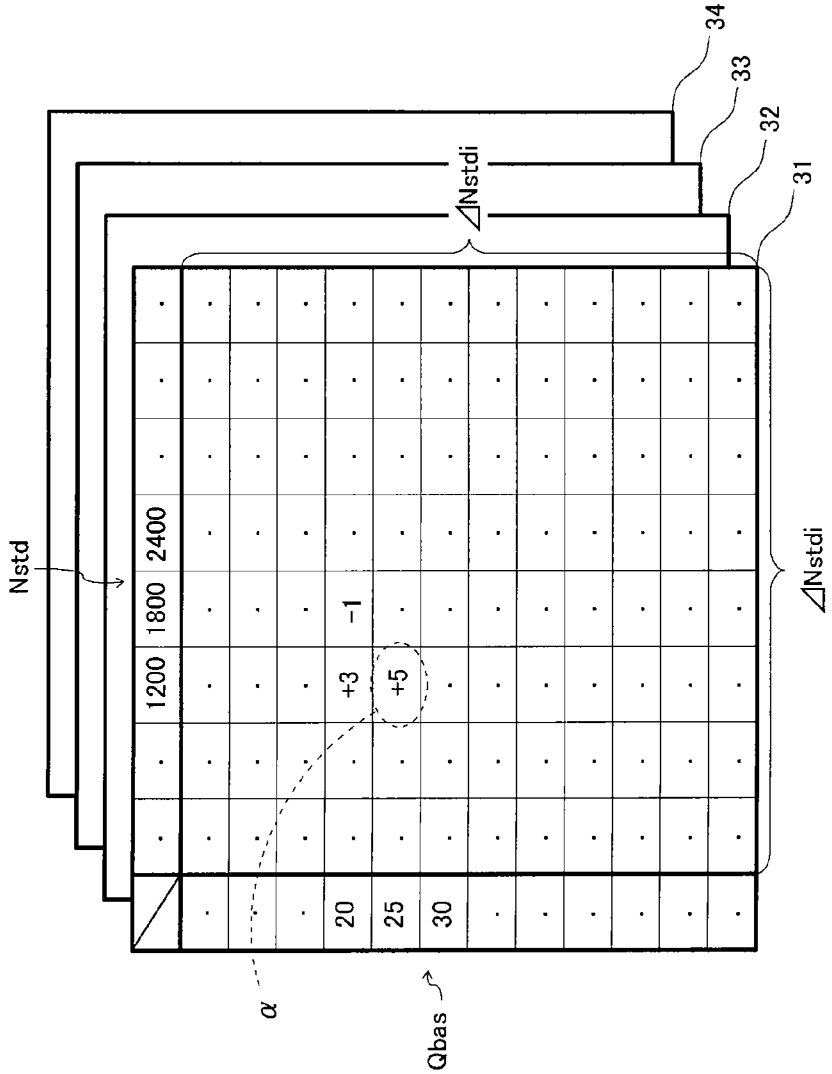
FIG. 4 is a table drawing of standard rotation speed maps.

For example, in FIG. 4, with regard to the cylinder having the individual standard rotation speed difference map 31, a cell a shows that the individual standard rotation speed difference ΔNstdi is +5 in the driving state that the basic injection amount Qbas is 25 $mm^3$/st and the standard rotation speed Nstd is 1200 rpm, whereby the individual standard rotation speed Nstdi is shown to be 1205 rpm.

The engine load is alternated with the basic injection amount Qbas above. However, in the case of a dynamo or a hydraulic pump that engine load is clear, the engine load itself may be used as an argument.

Explanation will be given on a fuel injection amount revision unit 110 which is another embodiment of the present invention in detail referring to FIGS. 5 and 6.

Figure 5:
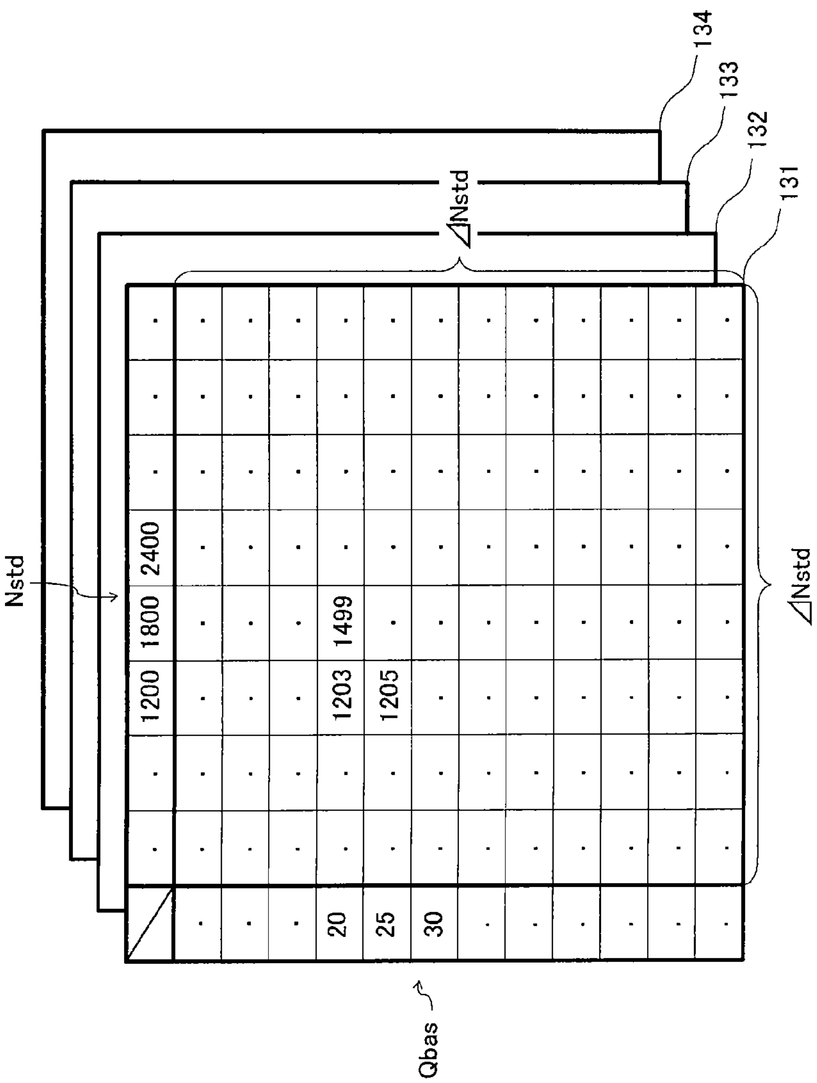
FIG. 5 is a block drawing of another each cylinder injection amount revision means.

As shown in FIG. 5, each of individual standard rotation speed maps 131 to 134 indicates the individual standard rotation speed Nstdi itself. Each of the individual standard rotation speed maps 131 to 134 indicates a matrix that the line is the basic injection amount Qbas as an alternate index of the engine load and the row is the standard rotation speed Nstd as the engine rotation speed.

Figure 6:
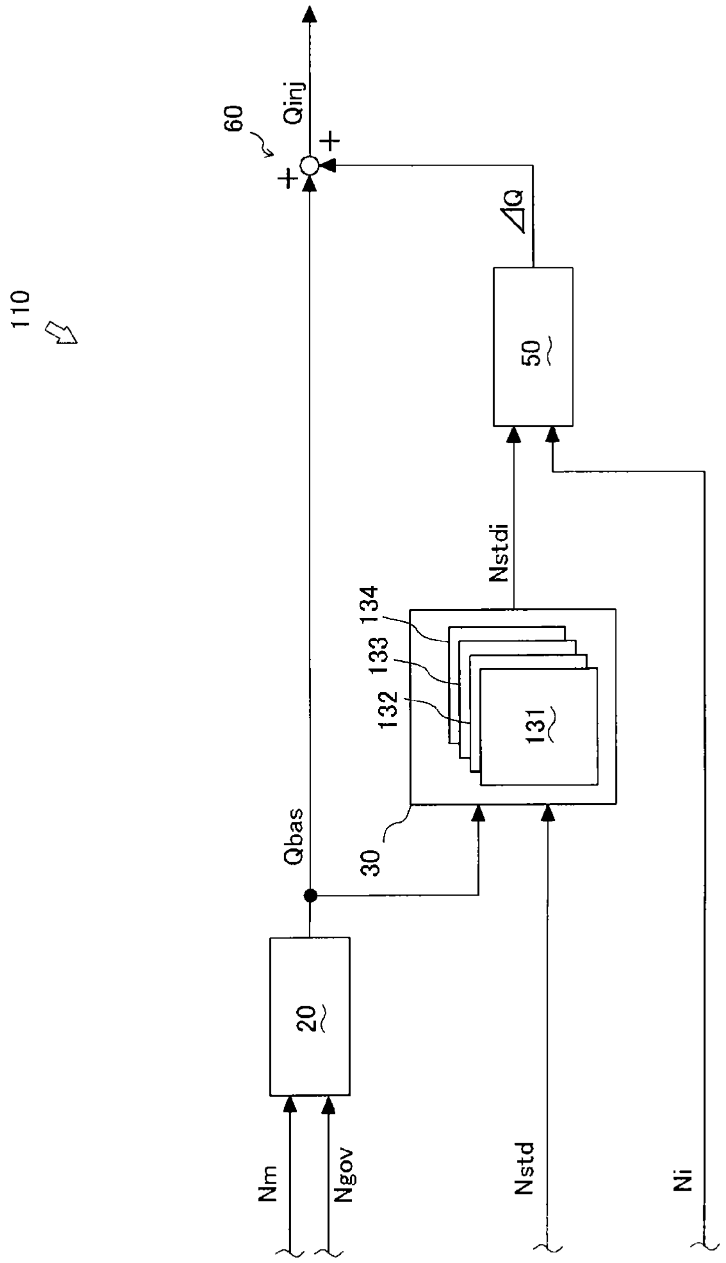
FIG. 6 is a table drawing of another standard rotation speed maps.

As shown in FIG. 6, fuel injection amount revision unit 110 comprises the basic injection amount output unit 20, the individual standard rotation speed output unit 30, the revision amount calculation unit 50 and the injection amount operation unit 60. Namely, since each of the individual standard rotation speed maps 131 to 134 indicates the individual standard rotation speed Nstdi, it is not necessary to calculate the individual standard rotation speed Nstdi from the standard rotation speed Nstd and the individual standard rotation speed difference ΔNstdi, whereby the difference operation unit 40 can be omitted.

According to this construction, the effect similar to the fuel injection amount revision system 10 can be obtained.

Explanation will be given on calculation timing of Qinj referring to FIG. 7.

For example, with regard to the #1 cylinder the ECU 100 selects individual standard rotation speed difference ΔNstd1 of the #1 cylinder stored in the individual standard rotation speed difference map 31 (#1) while using the basic injection amount Qbas and the row is the standard rotation speed Nstd of #1 at the fuel injection one combustion cycle before as arguments, thereby calculating individual standard rotation speed Nstd1.

Next, the ECU 100 calculates the average of rotation speed from the standard crank angle of the #1 cylinder one combustion cycle before to the TDC crank angle (the shaded portion in FIG. 7) as individual actual rotation speed Ni.

Then, the ECU 100 calculates injection revision amount ΔQ from the individual standard rotation speed Nstd1 and the individual actual rotation speed N1 and adds it to the basic injection amount Qbas based on the engine actual rotation speed Ngov calculated just before this fuel injection of the #1 cylinder so as to calculate Qinj.

Namely, the injection revision amount ΔQ is calculated based on the basic injection amount Qbas and the individual standard rotation speed Nstdi of the cylinder itself one combustion cycle before. Difference of one combustion cycle exists between Qbas which is the basis of Qinj and Qbas which is the argument of the injection revision amount ΔQ (=the individual standard rotation speed Nstdi). However, since the revision by the revision amount calculation unit 50 is performed at the stationary state as mentioned above, the difference between Qbas which is the basis of Qinj and Qbas which is the basis of the injection revision amount ΔQ is inconsiderable.

Figure 8:
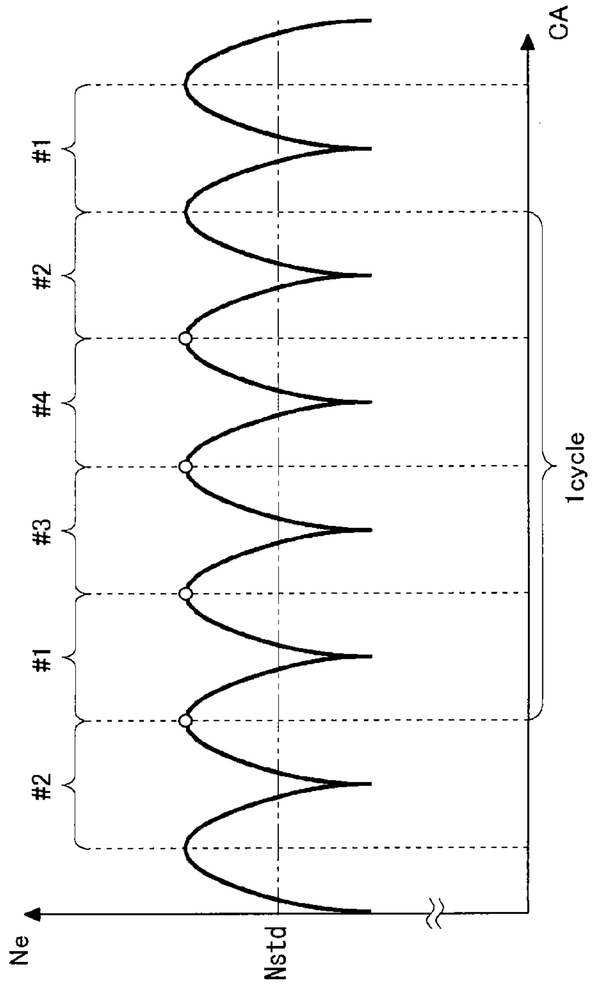
FIG. 8 is a graph of rotation speed against crank angle showing another operation timing about standard rotation speed.

Explanation will be given on another embodiment of the individual standard rotation speed Nstdi referring to FIG. 8.

In this embodiment, the individual standard rotation speed output unit 30 selects the maximum rotation speed in the range between the compression top dead point of the cylinder and the compression top dead point of the next cylinder (the white circle in FIG. 8) in the case that all the fuel injection valves are at the normal state as the individual standard rotation speed Nstdi of the cylinder itself. The individual actual rotation speed Ni is calculated similarly.

Since the individual standard rotation speed Nstdi of each cylinder is selected as the above, the rotation speed of each cylinder can be regulated while reflecting specific unevenness of rotation of each cylinder based on the rotation speed corresponding to the combustion process of each cylinder.

Accordingly, even if the change of rotation speed between the compression top dead point of each cylinder and the compression top dead point of the next cylinder is asymmetric about the crank angle, the rotation speed of each cylinder can be regulated while reflecting specific unevenness of rotation of each cylinder based on the rotation speed corresponding to the combustion process of each cylinder.

Next, explanation will be given on the selection method of the individual standard rotation speed difference ΔNstdi (individual standard rotation speed Nstdi) of the individual standard rotation speed difference maps 31 to 34 (131 to 134) of the individual standard rotation speed output unit 30 (130) in detail.

Firstly, explanation will be given on one of selection methods of the individual standard rotation speed difference ΔNstdi.

With regard to this selection method, the individual standard rotation speed difference ΔNstdi is defined as dispersion of rotation speed of each cylinder at the time of shipment of the engine 1 from a factory or at the time of regulation of the injectors 3. Namely, at the time of shipment or at the time of regulation of the injectors 3, the above-mentioned various kinds of data of each cylinder is obtained, and the dispersion of engine load and rotation speed between each cylinder is stored in the individual standard rotation speed difference maps 31 to 34.

Accordingly, the rotation speed of each cylinder can be regulated while reflecting specific unevenness of rotation of each cylinder without influence of secular degradation and the like.

Explanation will be given on another selection method of the individual standard rotation speed difference ΔNstdi.

With regard to this selection method, fuel injection of the engine 1 is stopped, that is, an external rotational driving means is connected to the crankshaft (output shaft) and fuel is not supplied so as to prevent the combustion, and then the dispersion of rotation speed of each cylinder at the time of motoring of the engine 1 is obtained as the individual standard rotation speed difference ΔNstdi. Namely, the dispersion of rotation speed of each cylinder in the no-load state not according to fuel injection is stored in the individual standard rotation speed difference maps 31 to 34.

Accordingly, at the time of shipment from the factory or the like, even if the engine cannot be driven actually, the individual standard rotation speed Nstdi in the no-load state can be judged by the motoring so as to regulate the rotation speed of each cylinder while reflecting specific unevenness of rotation of each cylinder.

Furthermore, explanation will be given on another selection method of the individual standard rotation speed difference ΔNstdi.

With regard to this selection method, the dispersion of rotation speed of each cylinder in the state that the crankshaft (output shaft) of the engine 1 is connected to a working machine is obtained as the individual standard rotation speed difference ΔNstdi. In this case, the working machine is a hydraulic pump, a dynamo, a reduction gear or the like. Namely, the dispersion of rotation speed of each cylinder of not the independent engine 1 but the engine in the product state (setting state) in which the engine is used actually is stored in the individual standard rotation speed difference maps 31 to 34.

Accordingly, even if the engine is unitized with a working vehicle such as a hydraulic pump or a dynamo which is always connected to the engine, revision accuracy of fuel injection amount can be improved.

INDUSTRIAL APPLICABILITY

The present invention is adoptable to a multi-cylinder engine.

The invention claimed is:

1. An engine having a plurality of cylinders wherein a fuel injection valve is provided in each of the cylinders and opening timing of each of the fuel injection valves can be controlled respectively, the engine comprising:

an individual standard rotation speed output means which outputs individual standard rotation speed of each of the cylinders following fuel injection of the corresponding fuel injection valve when all the fuel injection valves are in normal state, an individual actual rotation speed calculation means which calculates individual actual rotation speed of each of the cylinders following the fuel injection of the corresponding fuel injection valve, and a revision amount calculation means which calculates a revision amount of a fuel injection amount to each of the cylinders from the corresponding fuel injection valve based on a difference between the individual standard rotation speed and the individual actual rotation speed, wherein the individual standard rotation speed output means determines an average actual rotation speed of a certain cylinder based on a change of a crank angle of the certain cylinder from top dead center of the certain cylinder until reaching a crank angle at a center point between a compression top dead point of the certain cylinder and a compression top dead point of a next cylinder at a time that all the fuel injection valves are in a normal state, and wherein the individual actual rotation speed calculation means determines an average actual rotation speed of the certain cylinder as an average of rotation speed between a top dead point crank angle and the crank angle at a center point between a compression top dead point of the certain cylinder and a compression top dead point of the next cylinder.

2. An engine having a plurality of cylinders wherein a fuel injection valve is provided in each of the cylinders and opening timing of each of the fuel injection valves can be controlled respectively, the engine having:

an individual standard rotation speed output means which outputs individual standard rotation speed of each of the cylinders following fuel injection of the corresponding fuel injection valve when all the fuel injection valves are in normal state, an individual actual rotation speed calculation means which calculates individual actual rotation speed of each of the cylinders following the fuel injection of the corresponding fuel injection valve, and a revision amount calculation means which calculates a revision amount of a fuel injection amount to each of the cylinders from the corresponding fuel injection valve based on a difference between the individual standard rotation speed and the individual actual rotation speed, characterized in that:

the individual standard rotation speed output means selects rotation speed at a time that fuel injection is stopped and the engine is motored as the individual standard rotation speed.

* * * * *